C. M. ORTON.
ANIMAL-TRAP.

No. 193,419. Patented July 24, 1877.

WITNESSES:
E. Wolff
J. H. Scarborough

INVENTOR:
C. M. Orton
BY
ATTORNEYS.

UNITED STATES PATENT OFFICE.

CHAUNCEY M. ORTON, OF GLENS FALLS, NEW YORK.

IMPROVEMENT IN ANIMAL-TRAPS.

Specification forming part of Letters Patent No. 193,419, dated July 24, 1877; application filed May 21, 1877.

*To all whom it may concern:*

Figure 1:
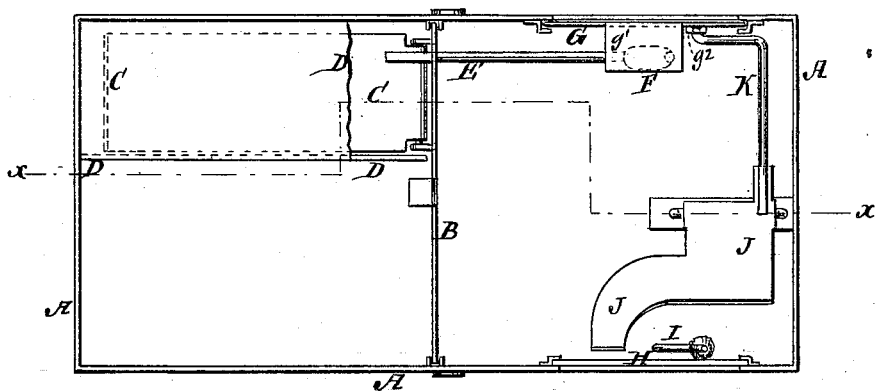
Figure 2:
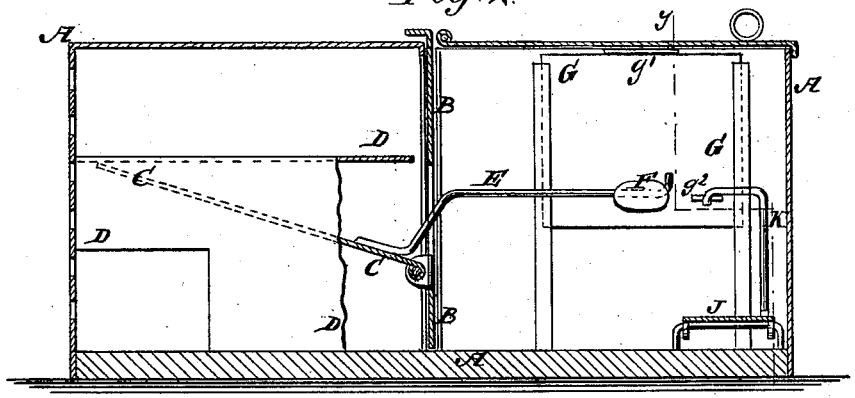
Figure 3:
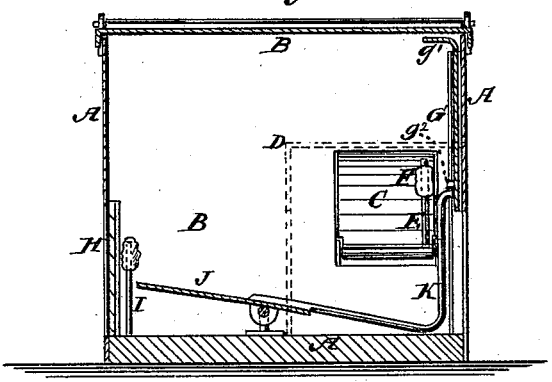

Be it known that I, CHAUNCEY M. ORTON, of Glens Falls, county of Warren, and State New York, have invented a new and useful Improvement in Self-Setting Animal-Trap, of which the following is a specification:

Figure 1 is a plan view of my improved trap, the top being removed. Fig. 2 is a vertical longitudinal section of the same, taken through the broken line $x\,x$, Fig. 1. Fig. 3 is a vertical cross-section of the same, taken through the broken line $y\,y$, Fig. 2.

Similar letters of reference indicate corresponding parts.

The invention consists in the construction and combination of parts, which will be hereinafter more fully described, and then pointed out in the claim.

In the drawing, A is the box of the trap, which is rectangular in form, and is designed to be made of tin, so that animals cannot eat their way out. The box A is divided into two compartments by a partition, B, that slides in grooves in the sides of the said box. In the partition B, near one side, is formed an opening of such a size that the animal trapped for can easily pass through it.

To the partition B, at the bottom of the hole through it, is pivoted the end of a drop-bridge, C, which works in a small chamber formed in one side of the inner compartment by a plate, D, said plate having an opening formed through it at the free end of the said bridge C.

To the pivoted end of the drop-bridge C is attached one end of a wire rod, E, which projects along the forward side of the outer compartment, and has a weight attached to its outer end sufficient to overbalance the drop-bridge C. In the forward side of the outer compartment is formed the entrance-opening, which is closed by a door, G, sliding in guide-cleats attached to the inner side of the side of the box A.

Upon the upper edge of the door G is formed an inwardly-projecting flange, $g^1$, which, when the said door is closed, is just above the weight F, so that the said door may be opened by the upward movement of the weighted rod E F.

In the rear side of the outer compartment of the box A, directly opposite the entrance-opening, is formed another opening, closed by a glass plate, H, so that the animal can see the bait placed upon a wire, I, attached to the bottom of the box A at the inner side of the glass plate H.

To a support attached to the bottom of the box A is pivoted a platform, J, which is so formed that the animal cannot approach the bait without stepping upon it. To the forward or pivoted end of the trip-platform J is attached the end of a wire rod, K, which is made of such a length, and is bent into such a shape, that its forward or free end may rest against the inner side of the door G, in such a position as to be beneath a low rib or projection, $g^2$, formed upon or attached to the inner side of the said door G.

The top of the outer compartment of the box A is loose, and is hinged at one edge, so that it may be turned back to give convenient access to said compartment.

The top of the inner compartment of the box A is stationary, and the end of said compartment is perforated with numerous holes to admit light.

The trap is set by drawing up the sliding partition B. The animal, in roaming about, sees the bait upon the wire L, and in seeking to reach it enters the box A, steps upon the platform J, and withdraws the wire H from door G, which allows said door to drop. The frightened animal, seeking to escape, passes through the opening in the partition B to the bridge C, which tilts under his weight, and he passes through the opening in the plate D into the inner compartment of the trap, and is securely caged. The descent of the bridge C raises the door G, which is caught and held by the wire K, and the trap is reset, the bridge C returning to its normal position as soon as the animal has passed from it.

Having thus fully described my invention, I claim as new and desire to secure by Letters Patent—

The combination of the sliding partition B, having an opening formed through it, the drop-bridge C, the weighted wire E F, with the box A, the plate D, having an opening formed through it, and the door G, provided with a flange, $g^1$, for setting and resetting the trap, substantially as herein shown and described.

CHAUNCEY M. ORTON.

Witnesses:
JAMES H. KENYON,
H. W. VAN DUSEN.